US011435866B2

(12) United States Patent
Gray

(10) Patent No.: US 11,435,866 B2
(45) Date of Patent: *Sep. 6, 2022

(54) TIME-BASED DEVICE INTERFACES

(71) Applicant: Amazon Technologies, Inc., Reno, NV (US)

(72) Inventor: Timothy T. Gray, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 30 days.

This patent is subject to a terminal disclaimer.

(21) Appl. No.: 15/651,561

(22) Filed: Jul. 17, 2017

(65) Prior Publication Data

US 2018/0004359 A1  Jan. 4, 2018

Related U.S. Application Data

(63) Continuation of application No. 13/414,974, filed on Mar. 8, 2012, now Pat. No. 9,710,123.

(51) Int. Cl.
| | | |
|---|---|---|
| *G06F 3/0481* | (2022.01) | |
| *G06F 1/16* | (2006.01) | |
| *G06Q 10/10* | (2012.01) | |
| *G06F 3/04883* | (2022.01) | |

(52) U.S. Cl.
CPC .......... *G06F 3/0481* (2013.01); *G06F 1/1694* (2013.01); *G06F 3/04883* (2013.01); *G06Q 10/109* (2013.01); *G06F 2200/1637* (2013.01)

(58) Field of Classification Search
CPC .......................... G06F 3/04847; G06F 3/0482
See application file for complete search history.

(56) References Cited

U.S. PATENT DOCUMENTS

| | | | |
|---|---|---|---|
| 9,710,123 B1 | 7/2017 | Gray | |
| 2003/0007464 A1 | 1/2003 | Balani | |
| 2006/0081771 A1* | 4/2006 | Eliad Wardimon | ....... G01J 1/32 |
| | | | 250/221 |
| 2007/0112929 A1* | 5/2007 | Etelapera | ............. G06Q 10/109 |
| | | | 709/207 |
| 2007/0229517 A1* | 10/2007 | May | ..................... G06Q 10/109 |
| | | | 345/501 |
| 2008/0122796 A1 | 5/2008 | Jobs et al. | |
| 2008/0148030 A1* | 6/2008 | Goffin | ............... H04M 1/72563 |
| | | | 713/1 |
| 2008/0165151 A1* | 7/2008 | Lemay | ................ G06F 3/04883 |
| | | | 345/173 |
| 2008/0195312 A1 | 8/2008 | Aaron et al. | |
| 2008/0307323 A1 | 12/2008 | Coffman et al. | |
| 2009/0228322 A1 | 9/2009 | van Os et al. | |
| 2010/0159967 A1 | 6/2010 | Pounds et al. | |

(Continued)

*Primary Examiner* — Rayeez R Chowdhury
(74) *Attorney, Agent, or Firm* — Pierce Atwood LLP

(57) ABSTRACT

A user interface on a computing device can utilize a calendar bar with various portions of the interface, such as a lock screen and home or application screens. The calendar bar can enable the user to view upcoming appointments and determine how much the user has before those appointments. The user can tilt the device or select an appointment to obtain additional information. If the device is unlocked or otherwise accessible, the user can also navigate back and forth between a calendar display and other information, such as past or present actions with respect to the device, and can scroll back in forth in time using any of these displayed portions.

17 Claims, 6 Drawing Sheets

(56) References Cited

U.S. PATENT DOCUMENTS

| | | | |
|---|---|---|---|
| 2010/0159995 A1 | 6/2010 | Stallings et al. | |
| 2010/0245042 A1* | 9/2010 | Tsubaki | G06F 21/32 340/5.82 |
| 2010/0265200 A1 | 10/2010 | Cho et al. | |
| 2011/0053581 A1* | 3/2011 | Kao | H04M 19/042 455/418 |
| 2011/0065490 A1* | 3/2011 | Lutnick | G07F 17/3279 463/16 |
| 2011/0090078 A1 | 4/2011 | Kim et al. | |
| 2011/0102345 A1* | 5/2011 | Kim | G06F 3/04883 345/173 |
| 2011/0167391 A1* | 7/2011 | Momeyer | G06F 3/038 715/863 |
| 2011/0283241 A1 | 11/2011 | Miller et al. | |
| 2011/0294467 A1 | 12/2011 | Kim et al. | |
| 2012/0066629 A1* | 3/2012 | Lee | G06Q 10/109 715/769 |
| 2012/0084691 A1* | 4/2012 | Yun | G06F 3/0481 715/769 |
| 2012/0287290 A1* | 11/2012 | Jain | H04N 21/4367 348/207.1 |
| 2013/0157726 A1* | 6/2013 | Miyazaki | H04M 1/724 455/566 |
| 2015/0046370 A1 | 2/2015 | Libin et al. | |
| 2015/0077126 A1* | 3/2015 | Wang | H01M 10/48 324/428 |
| 2015/0138101 A1* | 5/2015 | Park | G06F 3/04883 345/173 |
| 2015/0317893 A1* | 11/2015 | Tseng | H04M 1/72403 340/686.1 |

\* cited by examiner

TIME-BASED DEVICE INTERFACES

CROSS-REFERENCE TO RELATED APPLICATIONS

This application is a continuation of U.S. patent application Ser. No. 13/414,974, filed Mar. 8, 2012, the content of which is incorporated herein by reference.

BACKGROUND

People are increasingly relying on computers and other electronic devices to manage various types of content and information. For example, users are increasing utilizing portable computing devices such as smart phones and tablet computers to manage their upcoming appointments, contact lists, and pending tasks. In many cases, a computing device will require a user to unlock the device and navigate to an application that the user can open to view certain types of data, such as the user's schedule for the day. Such an approach can be at least inconvenient for a busy user who must continually perform these steps to determine upcoming events. Further, the content managed by the device is often not correlated or accessible in a way that is useful to the user, as a user often has to open and navigate between multiple applications to correlate various dates, times, and action items or event occurrences.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to enabling a user to access information on an electronic device. In particular, various embodiments provide a time-based interface that enables a user to view information about upcoming appointments from various screens of a computing device, even when the user has not unlocked the device. Further, the user can navigate forwards or backwards in time in order to determine actions or events that occurred in the past or may happen in the future. Various other applications, processes and uses are presented below with respect to the various embodiments.

Figure 1:
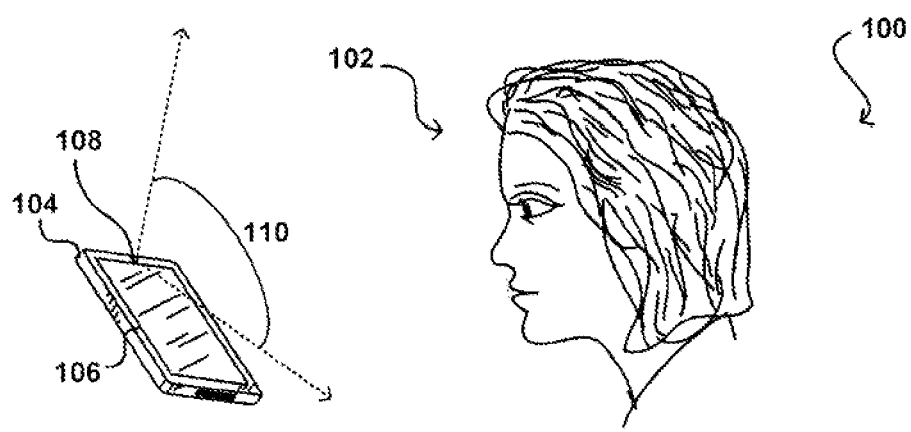
FIG. 1 illustrates a user viewing content on a computing device in accordance with various embodiments.

FIG. 1 illustrates an example situation 100 wherein a user 102 is viewing content rendered on a display screen 106 of a computing device 104. Although a portable computing device (e.g., a smart phone, an e-book reader, or tablet computer) is shown, it should be understood that various other types of electronic device that are capable of determining and processing input can be used in accordance with various embodiments discussed herein. These devices can include, for example, notebook computers, personal data assistants, video gaming consoles or controllers, and portable media players, among others. The computing device can include at least one camera 108 positioned on the device such that the camera is able to capture at least a portion of the user 102 when the user is within a field of view 110 of the camera 108. The camera can be configured such that the field of view will typically include the user when the user is viewing content displayed on the display screen. The image information is capable of being used by the device to determine a relative position of the user, which can be used for various purposes as discussed later herein.

Figure 2:
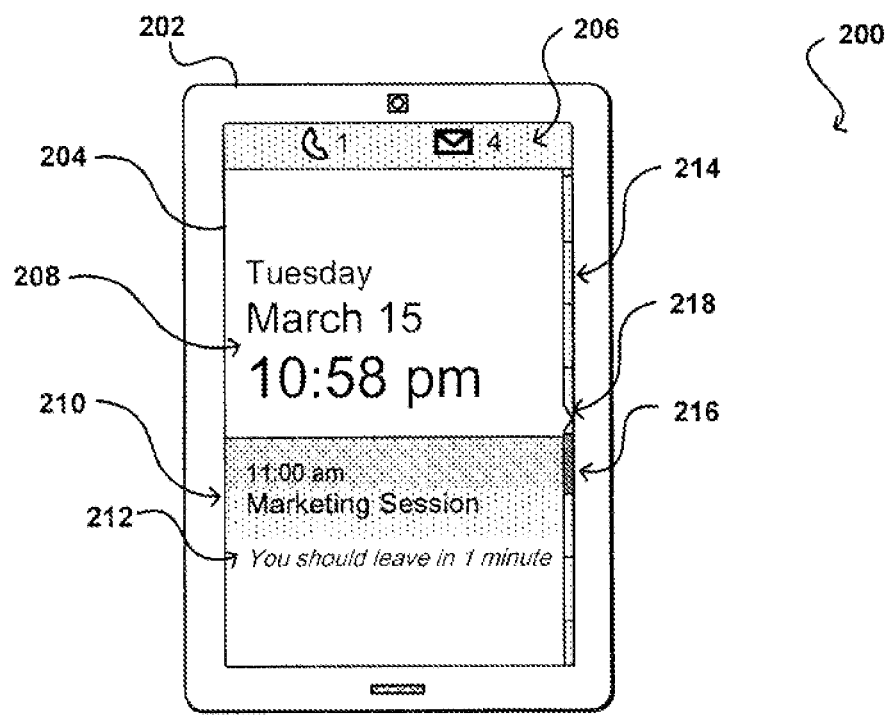
FIG. 2 illustrates a first example display that can be provided on a computing device in accordance with various embodiments.

FIG. 2 illustrates an example state 200 of a computing device 202 that can be presented in accordance with various embodiments. In this example, the device is presenting on a display screen 204 an interface view of a type that is often referred to as a "lock screen." A "lock screen" as used in the art refers to a set of information that is displayed when a device is picked up, taken out of standby mode, or otherwise activated by a user action, but the user has not yet "unlocked" the device such that information and functionality of the device can be accessed. The type of information displayed on a lock screen is typically fixed, as may include the date and time, and potentially the number of messages received since the user last accessed the device. In order to access more functionality or information the user must unlock the device, which typically includes at least providing an input to unlock the device, such as by swiping a graphical element, providing biometric identification, or entering a password, among other such actions. A user might use biometrics, passwords, or other security measures to prevent unauthorized use of the device, but such mechanisms also mean that the user must provide this security information in conventional approaches in order to obtain certain types of information.

Systems and methods in accordance with various embodiments enable the user to obtain information about the user's schedule from the lock screen, without having to perform the action(s) necessary to unlock the device. In the example of FIG. 2, the lock screen displays certain types of information that are often displayed on a lock screen, such as the date and time 208 and a number of new messages 208 of one or more types. In addition, the lock screen also displays a calendar bar 214 that enables the user to view the timing of upcoming appointments, tasks, or other scheduled events or actions. In this example interface, a pointer 218 (or other such marker) is provided that indicates where along the calendar or time bar the user is currently located, which in this example corresponds to the time 208 displayed adjacent the pointer. The calendar bar 214 is configured to automatically scroll as time passes, such that the pointer points to the current time on the calendar bar, and as appointments approach in time a display element for each of those appointments will approach the current pointer. For example, the calendar includes an entry 216 that is illustrated by a different color, shading, or other such aspect. As the appointment approaches in time, that entry information will scroll up the screen towards the pointer. The calendar bar also includes markings at regular intervals, such as every hour or every half hour, so the user can have some idea of the amount of time the user has before the next appointment, until the end of a current appointment, etc. In some embodiments, the user can have the ability to scroll the bar in either direction to determine information such as the number of upcoming appointments, length of upcoming appointments, and other such information.

In many situations, the user would like to also get an idea of what the upcoming appointment is, such that the user knows how far ahead to leave, what to prepare, etc. In various embodiments, the user is able to select the appointment 216 from the calendar bar 214 to get additional information. In this example, the user is able to obtain at least some information 210 about the upcoming appointment without unlocking the device. In some embodiments, the information can automatically be displayed when the appointment is approaching and the user is being reminded about the appointment. In at least some embodiments, the device can also determine when the user should leave for the appointment, such as may be based upon the current location and/or activity of the user, and can provide such information 212 on the lock screen along with the information 210 about the appointment. In at least some embodiments the reminder can be accompanied by another notification as well, such as an audible tone or tactile feedback, in order to draw the user's attention to the reminder. In at least some embodiments, the lock screen can also be automatically displayed (i.e., the display screen woken from a standby or sleep state) with such a reminder, whereby the user can view the information without having to manually wake the device.

Figure 3:
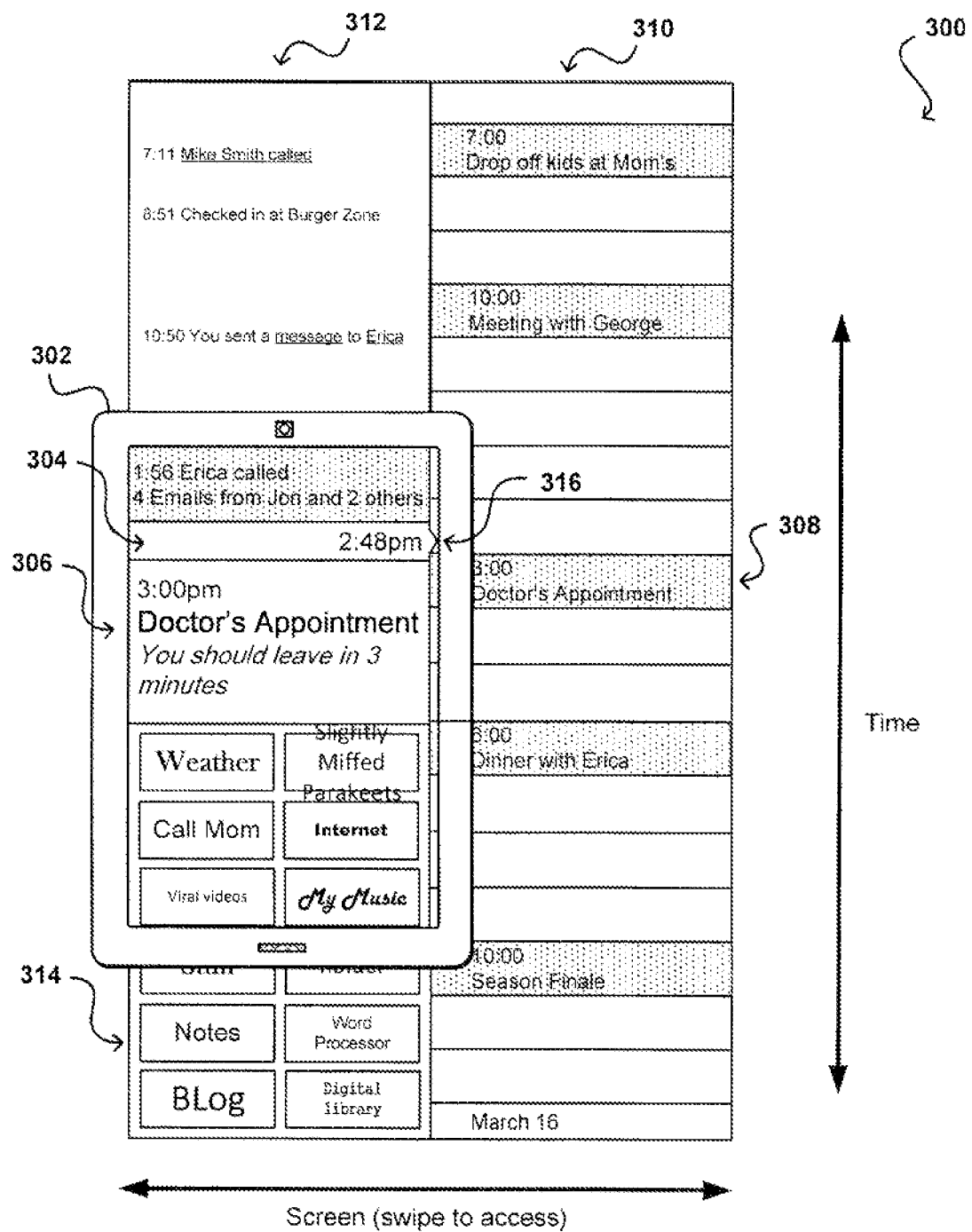
FIG. 3 illustrates an example interface layout that can be utilized in accordance with various embodiments.

In many instances the user will want to unlock the device to have access to additional information and/or functionality. The user can use any appropriate unlock action discussed herein or otherwise utilized for such purposes. Upon the device being unlocked, the device can display a portion of the interface of a type often referred to as a "home screen" or "home page." The home screen can be somewhat similar to the lock screen, in that specific types of information can be provided to the user, although the home screen is typically more customizable than the lock screen. FIG. 3 illustrates an example interface layout 300 that can be used in accordance with various embodiments. In this example, the home screen is shown to be displayed on the display screen of the computing device 302. The portions of the interface shown outside the computing device refer to portions of the interface that are not initially displayed but can be navigated to by the user, such as by performing a swipe action on the display screen or with a detectable gesture. The user can thus use the display screen as a window that can be maneuvered over the interface layout.

As illustrated, the interface is arranged by time, with information for events or actions that happened in the past being displayed towards the top of the figure, such that the user can navigate "up" in the interface to view past information. Information for events around the current time are displayed on the home screen, such as may include the current time 304, a pointer 316 for the current time on the calendar bar, and information for an upcoming appointment 306. Towards the top of the home screen is also information about recent, current, or pending messages, or other such information. As can be seen, the calendar bar of the home screen is actually a displayed portion of the user's calendar 310. If the user wants to get information about an event in the calendar bar, for example, the user can swipe the home screen to the left in this example to cause the calendar to be moved to the left (or the virtual window of the device effectively moved to the right over the layout) such that the relevant portion of the calendar can be displayed. In this example the user can swipe the interface to the left in order to view the upcoming appointment 308 on the user's calendar. The user can also swipe the calendar up and down in order to view upcoming appointments or appointments that occurred in the past.

Such an approach can help a user to obtain additional information associated with a point in time. For example, the portion 312 of the interface above the current time shows information about appointments, actions, or events that occurred in the past. For example, the user can view when certain messages were received, when the user was at certain locations, when the user was with other users, and other such information. The user can swipe or scroll up to this information directly from the home screen, similar to the approach described for the calendar 310. The user can also have the ability to scroll up on the calendar to see a past event, such as when the user met with George on the calendar, and then can swipe over to the left to see what events occurred when the user was with George. In this case, the user sent a message to Erica, which the user can locate through the association of that message to the user being with George at the time. Such an approach enables a user to search for information based not only on time but also where the user was, who the user was with, or other such information. Similarly, the user could scroll up to locate a specific action that occurred in the past, and then can scroll over to the right to determine where the user was when that action occurred based on what is in the user's calendar. Various ways of associating data by time can be used with such an interface, such as are described in co-pending U.S. patent application Ser. No. 12/950,896, filed Nov. 19, 2010, and entitled "Multi-Dimensional Data Association," which is hereby incorporated by reference herein.

In this example, the information below the default home screen portion of the interface relates to things that may occur in the future. For example, the relevant portion of the calendar 310 shows information for upcoming appointments or events. On the left portion of the layout below the current time, information for things the user can do (or "future" actions) can be displayed. In this example, various icons or tiles 314 are displayed that represent applications or widgets the user can access in the future, actions the user can take, or other such information. For example, if the user often accesses the Internet then a tile for a Web browser might be near the top of the group of tiles. Similarly, if the user typically calls his or her mother around this time, a tile that the user can select to dial his or her mother can move towards the top of the tile array. Various other types of information can be displayed as well as should be apparent in light of the teachings and suggestions contained herein.

Figure 4A:
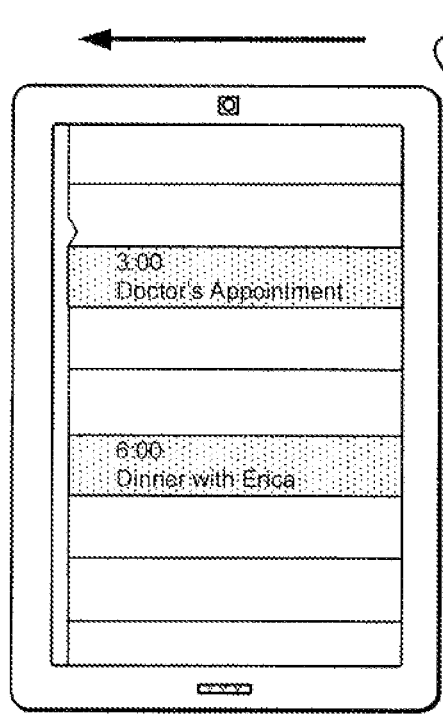
FIGS. 4(a) and 4(b) illustrate example interface displays that can be accessed using a layout such as that presented in FIG. 3.
Figure 4B:
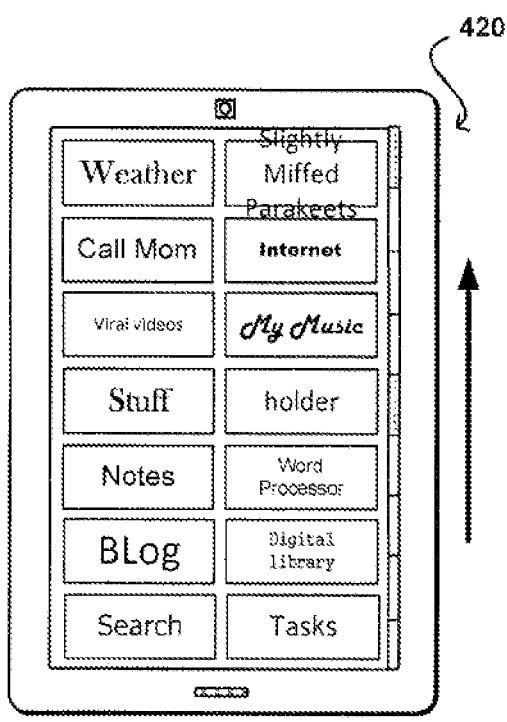

FIG. 4(*a*) illustrates a view 400 of the example interface layout when the user swipes the home screen to the left, such that the corresponding portion of the calendar is displayed. Similarly, FIG. 4(*b*) illustrates a view 420 of the interface layout when the user swipes the home screen up to view actions that the user can take in the future. The selection, type, and amount of information displayed can vary by device, user, or other such aspects, and in many embodiments can be at least partially configurable by the user. In some embodiments, the user can also have the option to zoom in and out with respect to the interface layout in order to obtain a more or less detailed view, more or less information, etc.

Figure 5:
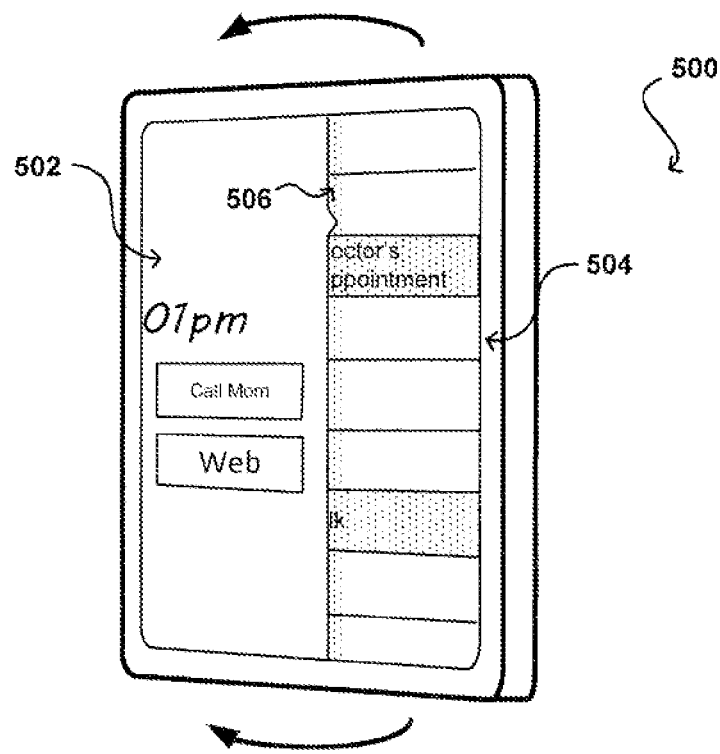
FIG. 5 illustrates functionality of an example interface that can rendered on a computing device in accordance with various embodiments.

As mentioned above, a computing device can determine a relative position of the user using a camera or other such sensor. By knowing the relative location of the user, the device can also enable additional information to be obtained through changes in orientation of the device. For example, the device can determine that the user is substantially in front of the device using captured image information. Using the image information and/or information from an orientation-determining element such as an electronic gyroscope or compass, the device can determine when the user tilts the device with respect to the user. Without knowing the relative location of the user from the image information, the device would be unable to tell from a gyroscope signal whether the viewing angle of the user changed or if the user rotated with the device. As illustrated in FIG. 5, when the device determines that the user has tilted the device so as to change the viewing angle, the device can provide a three-dimensional type display adjustment 500 wherein the information 504 "under" the home screen 502 can be viewed. For example, if the user wants information about an entry on the calendar bar, the user can tilt the device to cause more of the "lower" layer calendar bar to be displayed, such that additional information can be obtained without having to select a specific entry or unlock the device, although such functionality can be used with a home screen or other interface portion as well within the scope of the various embodiments. Approaches for determining changes in the relative orientation of a user based on image and/or sensor data are provided in co-pending application Ser. No. 12/950,896, incorporated by reference above.

Figure 6:
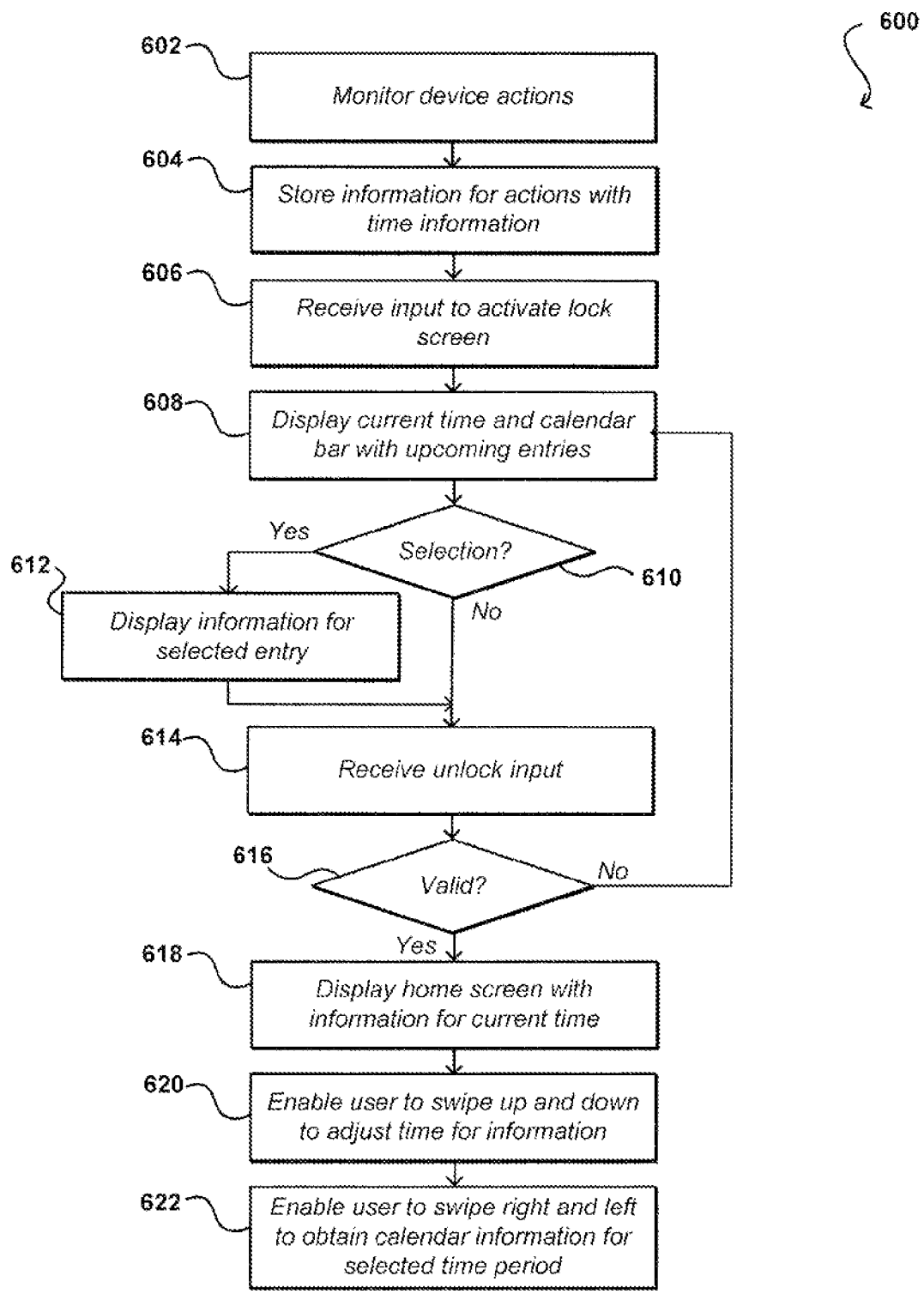
FIG. 6 illustrates an example process for providing a time-based interface that can be utilized in accordance with various embodiments.

FIG. 6 illustrates an example process 600 for providing a time-based interface that can be utilized in accordance with various embodiments. It should be understood that, for any process discussed herein, there can be additional, fewer, or alternative steps performed in similar or alternative orders, or in parallel, within the scope of the various embodiments unless otherwise stated. In this example, a computing device is configured to monitor 602 for various types of actions with respect to the device and/or a user of the device. These actions can include, for example, appointments, tasks, calls, messages, activating applications, completing games, or any other type of action, event, or occurrence that a user might want to later reference for any purpose. The device can store 604 (or cause to be stored) information for any or all of these events, with the information including time information such as a time of occurrence, a period of occurrence, a time of completion, or another such time. Other information such as location and type of task can be stored as well as appropriate. The data can also be stored in a way that enables the data to be associated across various dimensions, such as is described in co-pending application Ser. No. 12/950,896, incorporated by reference above.

The computing device can receive 606 input to activate a lock screen on the device. The input can be any appropriate input that can "wake up" or change the device from a standby mode, for example, as may include picking up the device, touching the device, performing a wake gesture, and the like. Methods for triggering a lock screen display are well known in the art and as such will not be discussed in detail herein. When rendering the lock screen, the device in this example will display 608 a certain amount of basic information, such as the current date and time, and will also display a calendar bar along a side or edge of the screen. The calendar bar can indicate upcoming appointments or times of availability, such as by showing colored blocks or other graphical indicators as discussed herein and as known for electronic calendar applications. As discussed, the calendar bar can update over time such that upcoming information for the current time is displayed, although in at least some embodiments a user can have the ability to scroll the calendar bar to obtain information for different times. If a selection of a specific time entry is received 610, at least some information for that entry can be displayed. In some embodiments, the type or amount of information can be limited on the lock screen in order to preserve confidentiality, protect sensitive information, etc. As discussed, other information can be displayed as well, such as reminders of when to leave for the selected entry (or another upcoming entry, as may be displayed automatically as discussed herein).

When the lock screen is displayed (or at other appropriate times or device states for various embodiments), the device can receive 614 input to unlock the device. As discussed, this can include any appropriate input for unlocking the device, such as providing biometric information or a password, or selecting an unlock option on the device. If the unlock input is determined 616 to be valid, a home screen (or other such interface portion) can be displayed 618 on the device, which includes information for the current time, such as pending messages, the time and date, and other such information, as well as a calendar bar as displayed on the home screen. In at least some embodiments, a representation of the calendar will always be available when the user is on the lock screen or a home screen of the device. The device can enable 620 the user to swipe (or otherwise navigate) up and down on the page to adjust the time for the information displayed. As discussed, this can enable the user to obtain information about actions that occurred in the past, or actions that can be taken or occur in the future. The device also can enable 622 the user to swipe (or otherwise navigate) right and left to obtain calendar information for the selected time period. The user can also swipe up and down while viewing calendar information to adjust the time period, and can go from a certain time period on the calendar to information for actions that occurred at that time by swiping right or left again. It should be understood that up, down, right, and left actions are merely examples, and that the calendar could be accessed with an up and down motion, diagonal motion, back and forth motion, or other such action or input in accordance with the various embodiments.

An advantage of various embodiments is that at least a portion of the calendar can always be viewable to the user whenever the user is on a home screen, lock screen, or similar interface location. In some embodiments, the calendar bar can always be displayed independent of what else is being displayed on the screen, such that the user can view upcoming appointments even if playing a game or watching a movie. In such embodiments, the user can still tilt the device or select an entry to obtain more information, and can easily determine how much time the user has for a current activity before an upcoming appointment, etc.

Another advantage of various embodiments is the ability to use swipe navigation to locate certain information. For example, a user might want to determine what the user did for a spouse's birthday last year. The user can move to the calendar then scroll or otherwise navigate back to the birthday last year, then can swipe or move over to an information section that can show information such as the restaurant where the user checked in, which pictures were taken that day, who the user was with, and other such information. Similarly, if the user cannot remember the spouse's birthday, the user can scroll or navigate to the name of the restaurant where the user checked in, and then can navigate to the calendar or other related information to see if that instance corresponds with the birthday.

In some embodiments, a calendar bar can use different colors, shadings, graphics, animations, or other such aspects to differentiate different types of appointments or actions, such as one color for work appointments, one color for personal appointments, etc. In some embodiments, the user will already utilize such approaches with the user's calendar, and the customization of the calendar can automatically be reflected in the calendar bar, which shows a portion of the user's calendar. In at least some embodiments, a user can install or utilize a different calendar application, and that calendar application can still be partially shown by the calendar bar. Various other options can be used as well within the scope of the various embodiments.

Figure 7:
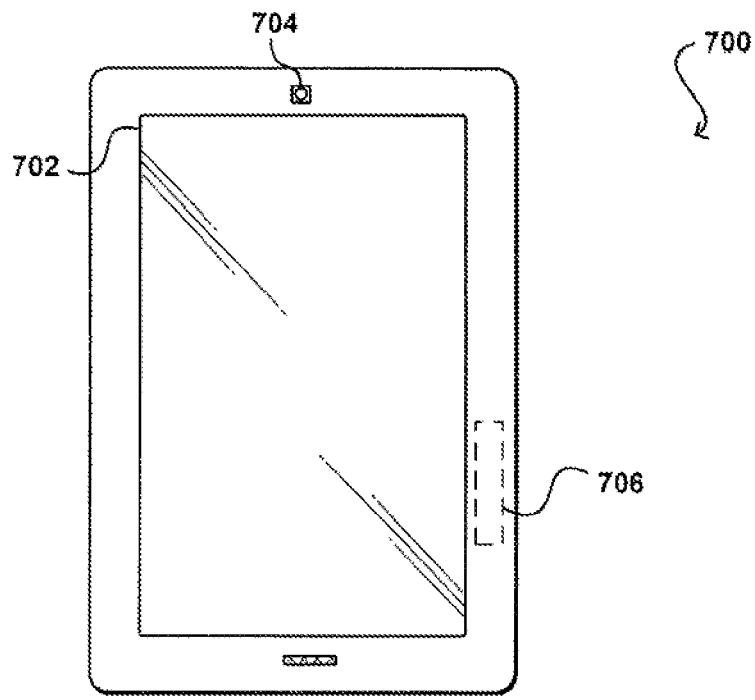
FIG. 7 illustrates an example computing device that can be used in accordance with various embodiments.

FIG. 7 illustrates an example computing device 700 that can be used in accordance with various embodiments. In this example, the device has a conventional digital camera 704 on a same side of the device as a display screen 702, enabling the device to capture image information about a user of the device during typical operation where the user is at least partially in front of the display screen. It should be understood that there can be additional cameras, sensors, or other such elements on the same or other sides or locations of the device as well within the scope of the various embodiments, such as may enable gesture or image input from any desired direction or location with respect to the device. The device can also include additional elements that can be used to assist with image capture, including a light sensor for determining an amount of light in a general direction of an image to be captured and an illumination element, such as a white light emitting diode (LED) or infrared (IR) emitter, for providing illumination in a particular range of directions when, for example, there is insufficient ambient light determined by the light sensor. Various other elements and combinations of elements can be used as well within the scope of the various embodiments as should be apparent in light of the teachings and suggestions contained herein. The device also includes at least one motion sensor 706 operable to determine rotations and/or translations of the device, for use in point of view determinations as discussed herein.

Figure 8:
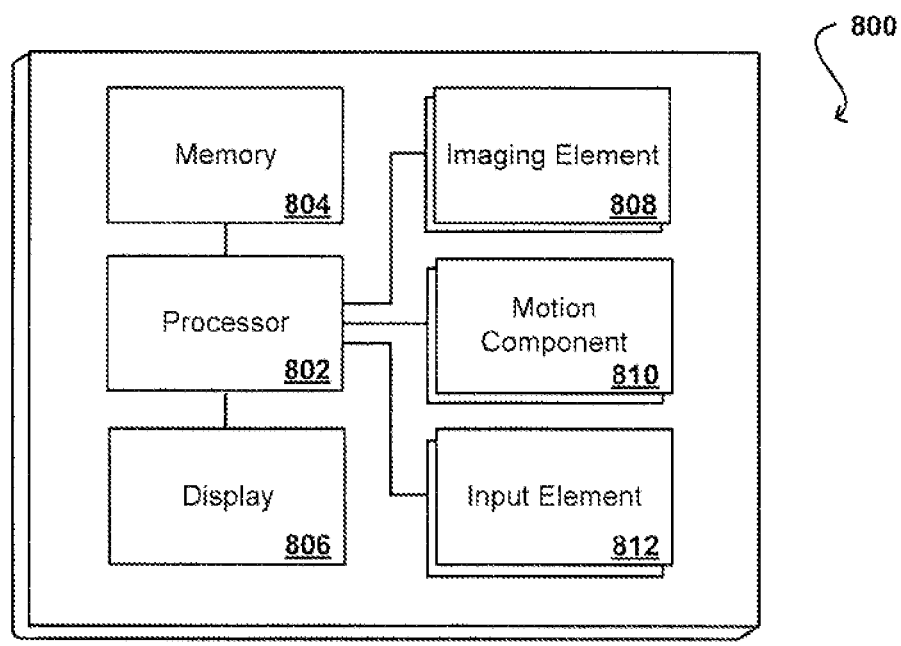
FIG. 8 illustrates an example configuration of components of a computing device such as that illustrated in FIG. 7.

In order to provide various functionality described herein, FIG. 8 illustrates an example set of basic components of a computing device 800, such as the device 700 described with respect to FIG. 7. In this example, the device includes at least one central processor 802 for executing instructions that can be stored in at least one memory device or element 804. As would be apparent to one of ordinary skill in the art, the device can include many types of memory, data storage or computer-readable storage media, such as a first data storage for program instructions for execution by the processor 802, the same or separate storage can be used for images or data, a removable storage memory can be available for sharing information with other devices, etc. The device typically will include some type of display element 806, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 808, such as one or more cameras that are able to image a user, people, or objects in the vicinity of the device. An image capture element can include, or be based at least in part upon any appropriate technology, such as a CCD or CMOS image capture element having a determine resolution, focal range, viewable area, and capture rate. The device also includes at least one motion determining element 810, such as an inertial sensor, accelerometer, electronic gyroscope, or electronic compass operable to provide information about an orientation of the device, as well as information about rotations or translations of the device. The processor 802 can utilize information from the cameras and motion sensors to determine point of view changes in accordance with various embodiments.

The example device can include at least one additional input device 812 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 9:
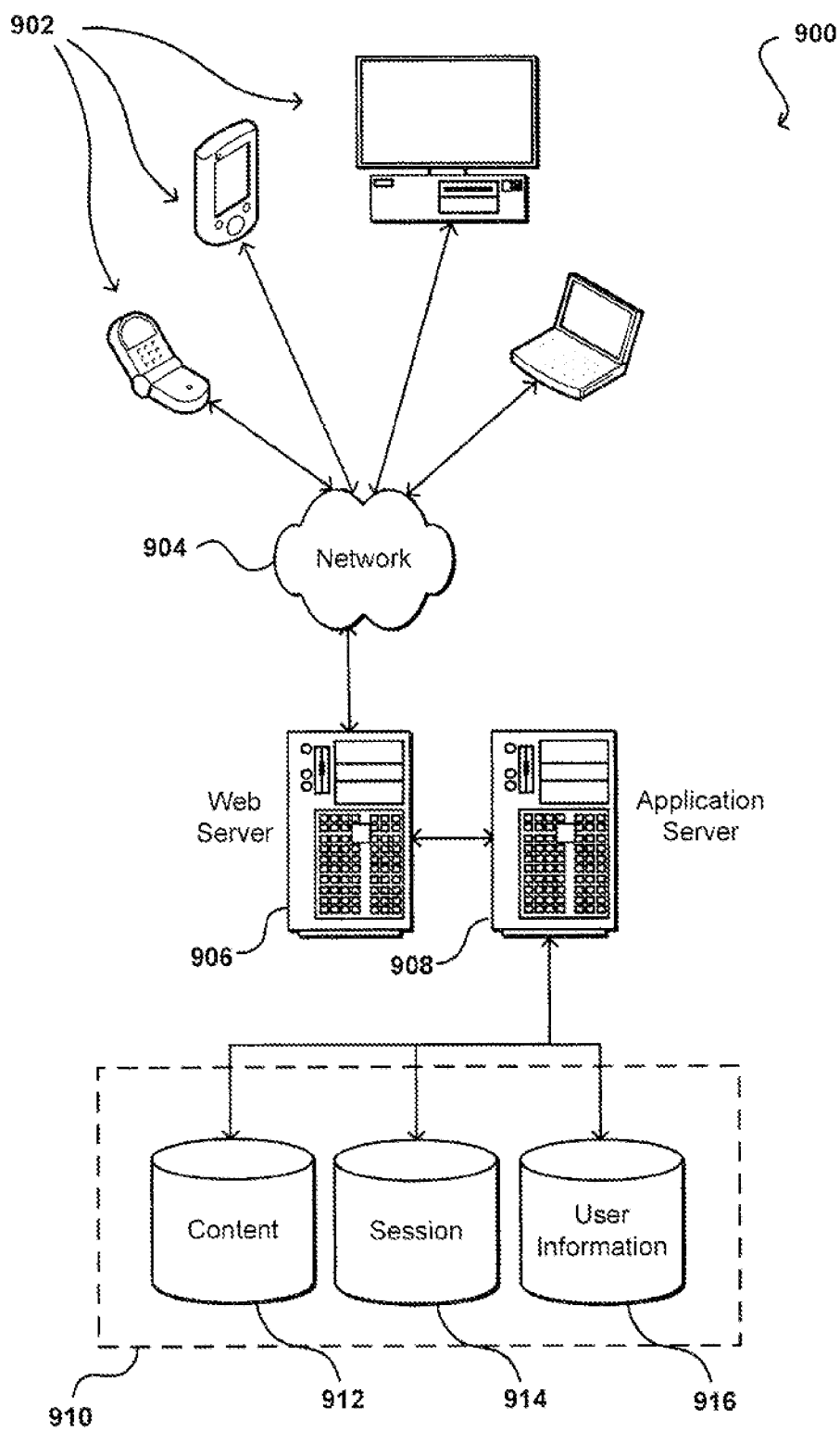
FIG. 9 illustrates an example environment in which aspects of the various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    generating, while a computing device is secured, a first notification of an upcoming event, the first notification one of at least an audio tone or a vibration;
    determining motion information by using a motion sensor, the motion information representing at least one of rotation or translation of the computing device;
    determining from the motion information and while the computing device is secured, that the computing device has been picked up;
    while the computing device is secured and based at least on determination that the computing device has been picked up, causing the computing device to display a lock screen; and
    while the computing device displays the lock screen:
        displaying a second notification of the upcoming event,
        receiving biometric information representing a user, the biometric information based at least on image data,
        authenticating the user, based at least on the biometric information, and
        displaying, as part of the lock screen, calendar information related to the upcoming event, wherein display of the lock screen provides scrolling for navigation to information related to at least one additional event.

2. The computer-implemented method of claim 1, further comprising:
    displaying additional calendar information on a home screen.

3. The computer-implemented method of claim 1, further comprising:
    displaying a marker representing current time in conjunction with additional calendar information.

4. The computer-implemented method of claim 1, further comprising:
    displaying an icon representing a calendar widget related to additional calendar information.

5. The computer-implemented method of claim 1, further comprising:
    receiving a swipe input; and
    scrolling additional calendar information.

6. The computer-implemented method of claim 1, further comprising:
    displaying a home screen;
    receiving a swipe input oriented in a vertical direction; and
    scrolling the home screen.

7. The computer-implemented method of claim 6, further comprising:
    scrolling a plurality of future calendar events based at least on the swipe input.

8. The computer-implemented method of claim 1, further comprising:
    displaying a plurality of future calendar events in time order.

9. The computer-implemented method of claim 1, further comprising:
    generating the first notification of the upcoming event a predetermined time in advance of the upcoming event.

10. A computing device, comprising:
    a speaker;
    a vibration generator;
    a touch screen display element;
    a motion sensor;
    at least one camera;
    at least one processor; and
    memory, the memory including instructions that, when executed by the at least one processor, enable the computing device to:
        generate, while the computing device is secured, a first notification of an upcoming event, the first notification being one of at least an audio tone generated by the speaker or a vibration generated by the vibration generator;
        determine motion information by using the motion sensor, the motion information representing at least one of rotation or translation of the computing device;
        determine from the motion information and while the computing device is secured, that the computing device has been picked up;
        while the computing device is secured and based at least on determination that the computing device has been picked up, cause the computing device to display a lock screen; and
        while the computing device displays the lock screen:
            display a second notification of the upcoming event,
            receive biometric information representing a user, the biometric information based at least on image data generated by the at least one camera,
            authenticate the user, based at least on the biometric information, and display, as part of the lock screen, calendar information related to the upcoming event, wherein display of the lock screen provides scrolling for navigation to information related to at least one additional event.

11. The computing device of claim 10, wherein the instructions when executed further enable the computing device to:
display additional calendar information on a home screen by the touch screen display element.

12. The computing device of claim 10, wherein the instructions when executed further enable the computing device to:
display a marker by the touch screen display element, the marker representing current time in conjunction with additional calendar information.

13. The computing device of claim 10, wherein the instructions when executed further enable the computing device to:
display an icon by the touch screen display element, the icon representing a calendar widget related to additional calendar information.

14. The computing device of claim 10, wherein the instructions when executed further enable the computing device to:
display a home screen;
receive a swipe input on the touch screen display element, the swipe input being in a vertical direction; and
scroll the home screen.

15. The computing device of claim 14, wherein the instructions when executed further enable the computing device to:
scroll a plurality of future calendar events based at least on the swipe input.

16. The computing device of claim 10, wherein the instructions when executed further enable the computing device to:
display a plurality of future calendar events in time order.

17. The computing device of claim 10, wherein the instructions when executed further enable the computing device to:
generate the first notification of the upcoming event a predetermined time in advance of the upcoming event.

\* \* \* \* \*